J. L. HULBERT.
METHOD OF MECHANICALLY MILKING.
APPLICATION FILED MAR. 29, 1913.

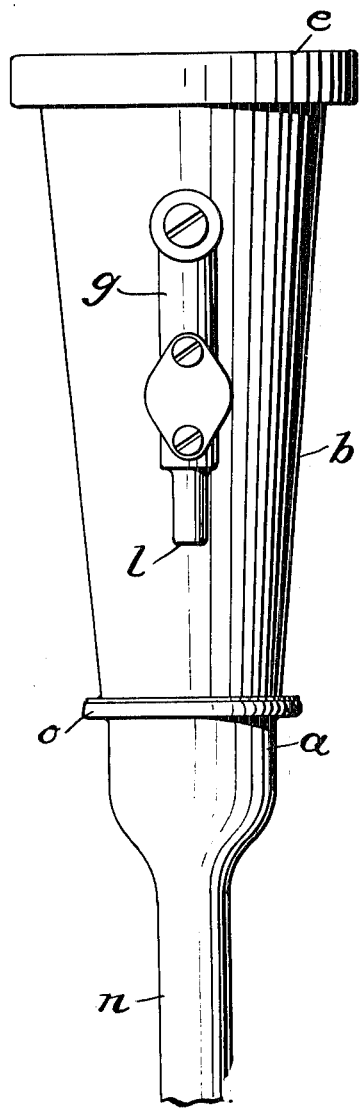
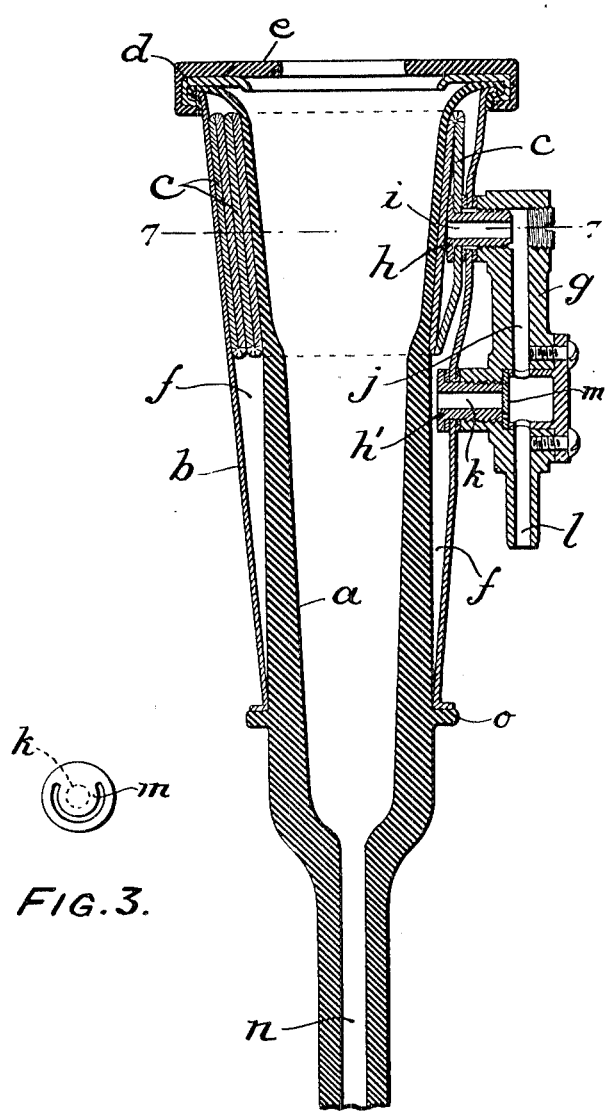

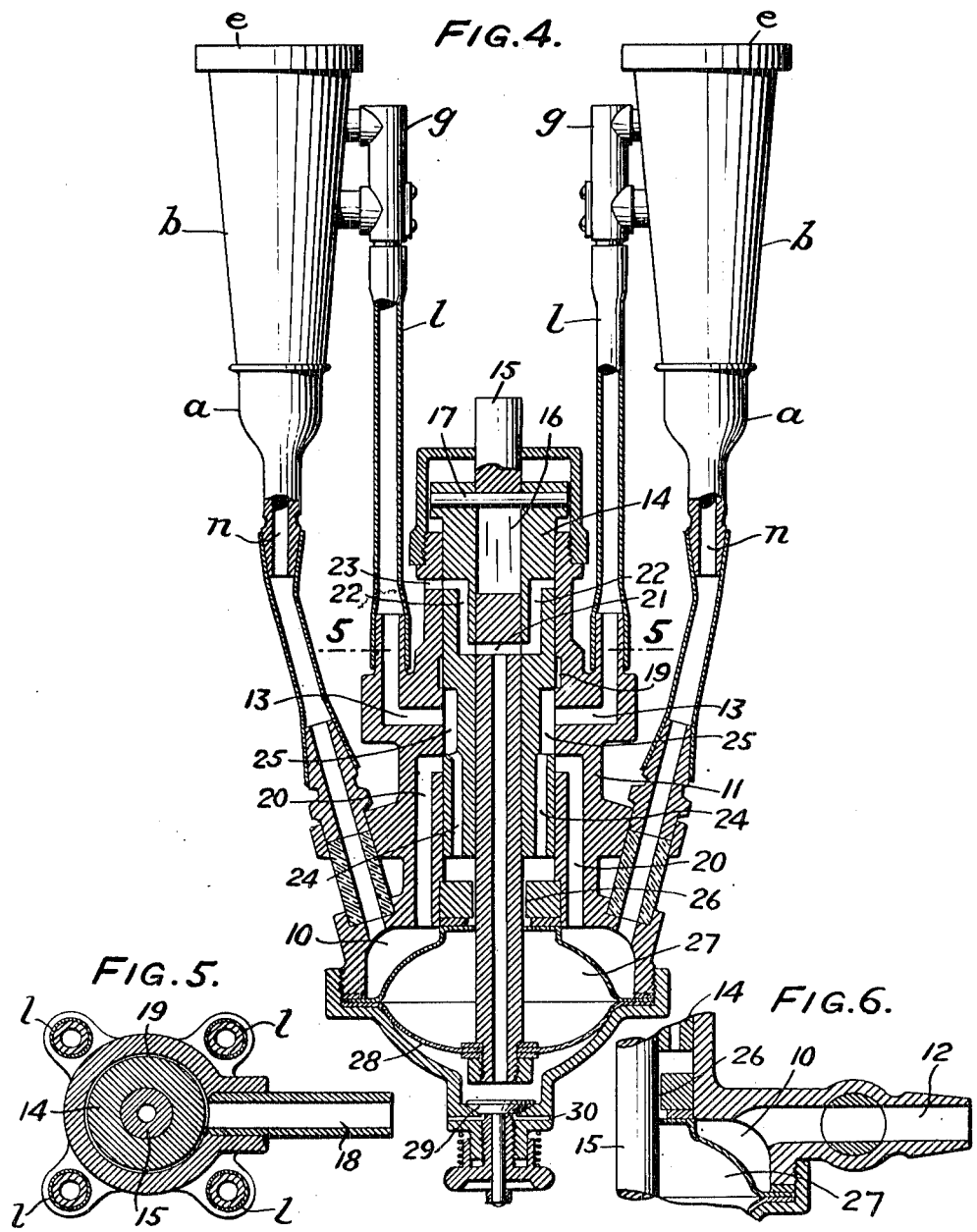

1,089,839.

Patented Mar. 10, 1914.

3 SHEETS—SHEET 3.

WITNESSES:

INVENTOR
John L. Hulbert
BY
Frank S. Busser
ATTORNEY.

UNITED STATES PATENT OFFICE.

JOHN L. HULBERT, OF POUGHKEEPSIE, NEW YORK, ASSIGNOR TO THE DE LAVAL SEPARATOR COMPANY, A CORPORATION OF NEW JERSEY.

METHOD OF MECHANICALLY MILKING.

1,089,839.  Specification of Letters Patent.  Patented Mar. 10, 1914.

Application filed March 29, 1913. Serial No. 757,576.

*To all whom it may concern:*

Be it known that I, JOHN L. HULBERT, a citizen of the United States, residing at Poughkeepsie, county of Dutchess, and State of New York, have invented a new and useful Improvement in Methods of Mechanically Milking, of which the following is a full, clear, and exact description, reference being had to the accompanying drawings, which form a part of this specification.

My invention relates to the extraction of milk from cows.

The object of my invention is to prevent expansion of the milk passage and dilation of the teat during the milking operation.

My process consists in intermittently applying a squeezing pressure to the base of the teat to cause the milk to flow therefrom, and simultaneously with the application of such pressure to apply a lesser pressure to the remainder or lower portion of the teat, thereby securing the result above named without obstructing the flow of milk through the teat to the outlet thereof.

The execution of my process is not dependent upon the employment of any particular mechanism; but in practice I have successfully carried out the process by means of a special type of teat cup combined with a special type of pulsator, as fully set forth in an application filed by me June 1, 1912, No. 700,951. In order, therefore, that my process may be fully understood I shall describe the construction and operation of the means and instrumentalities set forth in my said application, but shall confine the claims herein to the process carried out thereby, and claim the novel structural features in my said application.

Figure 7:
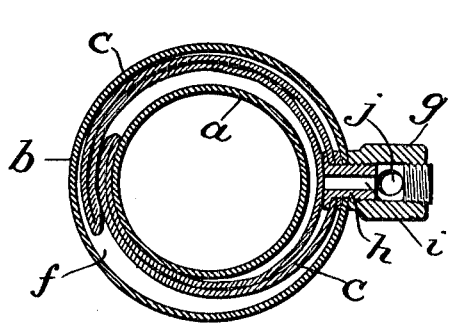
Figure 8:
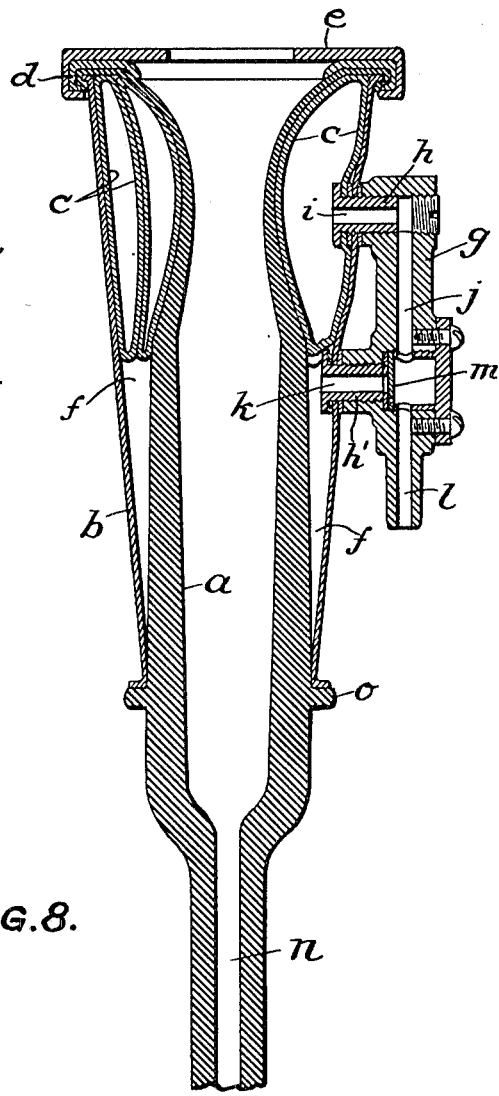

In the drawings: Figure 1 is a side elevation of the teat cup employed by me in carrying out my process. Fig. 2 is a vertical sectional view of same showing the cushion deflated. Fig. 3 is a face view of the valve controlling one of the air passages in the fitting. Fig. 4 is a sectional view of a pulsator connected with two teat cups. Fig. 5 is a cross-section on line 5—5 of Fig. 4. Fig. 6 is a partial section showing outlet from milk chamber to milk receptacle. Fig. 7 is a section on the line 7—7 of Fig. 2. Fig. 8 is a vertical sectional view, similar to Fig. 2, with the cushion inflated.

The teat cup shown in the drawings consists of a flexible cup proper $a$, a rigid outer shell $b$, a cushion $c$, a rigid cap $d$, a flexible mouth piece $e$ and a fitting $g$, all arranged and connected as hereinafter described.

The cup proper $a$ is made of soft rubber or similar material and surrounds the entire teat. The upper part is made thin so as to be readily compressed around the teat. The lower part is given a greater thickness, thus making it stiff enough to be nearly self-supporting under ordinary conditions of operation. From the lower end, the extension $n$ forms a tube leading to the milk receiving chamber 10 hereinafter described.

The rigid outer shell $b$ is, for considerations of lightness and cleanliness, preferably made of aluminum, though other materials may be used. The shell $b$ has a bottom flange against which the ring $o$ on the cup fits and an upper flange around which the thin upper end of the cup $a$ is drawn and then fastened by forcing on the cap $d$. The shell $b$ also has openings for the nipples $h$ and $h'$. It protects the rubber parts from injury, provides an exterior support for the cushion $c$, and forms the outer wall of the chamber $f$.

The cushion $c$ is made of rubber or similar material and may be in the form of a bag surrounding the cup $a$ and having the ends lapped or of such other form as may be found satisfactory. It is secured in place by means of the nipple $h$ hereinbefore mentioned.

The rigid cap $d$ is, like the shell $b$, and for the same reasons, preferably made of aluminum, and serves to hold the upper end of the cup $a$ to the shell and to support it so that the pressure due to expansion of the cushion $c$ cannot stretch it too far to tear it loose from the shell.

The mouthpiece $e$ is made of rubber or similar flexible material and serves to seal the upper end of the cup around the teat and prevent the leakage of air at this point. It also prevents the contact of metal parts with the teat or udder. Such contacts have been found injurious in some cases.

The fitting $g$, like the shell $b$ and cap $d$, and for the same reasons, is preferably made of aluminum. It comprises the nipples $h$ and $h'$ hereinbefore mentioned, both of which are screwed into the body $g$ of the fitting and have respectively the passages $i$ and $k$. These passages communicate at their outer ends with a vertical passage $j$—$l$ formed in the body of the fitting and at their inner ends with the cushion $c$ and chamber $f$ respectively. $m$ is a flap-valve normally closing communication between passages $k$ and $l$, adapted to open outward toward passage $l$ to permit air to be exhausted from the chamber but adapted to close upon admission of pressure to passage $l$ to prevent the return of air to the chamber.

I will now describe the pulsator shown in Figs. 4, 5 and 6. The pulsator comprises, in general, the milk receiving chamber 10 and the valve casing 11. 12 is the outlet from the milk receiving chamber leading to a milk receptacle (not shown). The pipe 12 is constantly under suction tending to produce a vacuum or partial vacuum in the milk receiving chamber 10, in the extension $n$, and in the interior of the teat cups. 13 is a passage in the valve casing 11, the same connecting with the pipe $l$. The valve comprises the valve proper 14 and the hollow valve stem 15. The valve stem has a slotted portion 16 through which extends a pin 17 connected with the valve proper 14. 18 is an inlet to the valve casing from any source of pressure supply. The inlet 18 terminates in an annular chamber 19 between the valve casing 11 and the valve proper 14. 20, 20, are passages in the valve casing leading upward from the milk receiving chamber 10 to the valve chamber. 21 is a passage or port through the wall of the valve stem 15 and communicating with the hollow portion of the stem. 22, 22 are passages in the valve proper communicating with the exhaust port 23. 24 and 25 are communicating passages in the valve proper. The valve stem 15 does not make a close fit with the lower part of valve casing 11 but leaves a constricted annular passage 26. 27 is a diaphragm chamber having therein the diaphragm 28. In the lower portion of the diaphragm chamber is a puppet valve 29 controlling the atmospheric port 30.

When the valve 14 and valve stem 15 are in their lower positions, the diaphragm chamber 27 is, by passages 26, 24 and 20, in connection with the milk chamber 10, which, being under vacuum, relieves the pressure above the diaphragm 28, the puppet valve 29 lifts, and the air pressure below the diaphragm causes it to lift, lifting the hollow valve stem 15 with which it is connected. The stem 15 lifts until the slot and pin connection between it and the valve proper 14 causes the latter to lift also. This brings passages 25 and 24 in communication with the source of pressure supply and passage 25 in connection with the passages 13 connecting with the pipe $l$, into which air under pressure is thus admitted, with the resultant operation upon the teat cups hereinafter described. At the same time, through passages 25 and 24 air under pressure is admitted beneath the valve, causing it to quickly complete its movement to the top. Through the constricted passage 26 pressure is also slowly admitted to the diaphragm chamber above the diaphragm 28 which, with the valve stem 15, is forced down slowly, the movement being partly resisted by the compression of air below the diaphragm 28. During the downward movement of the valve stem 15 the upper end of the slot 16 strikes the pin 17 at the instant that the port 21 registers with the passage 22. It then carries with it the valve proper 14. When the passage 22 registers with the port 23 the compression in the space below the diaphragm 28 is relieved through the hollow stem 15, the port 21, the passage 22 and the port 23. A very slight further movement of the valve 14 covers the groove 19 and cuts off the supply of compressed air; but the expansion of the air in the space above the diaphragm 28 completes the movement of the diaphragm and, by the valve stem 15 and pin 17, carries the valve proper 14 to the position where groove 25 communicates with passage 20. The air from below the valve 14 escapes to the vacuum through passages 24 and 20, the milk chamber 10 and the passage 12. Atmospheric pressure, acting on the top of valve 14, completes the valve movement and connects the pipe $l$, through the passage 13, groove 25 and passage 20, with the milk chamber 10 and exhaust, with the resultant operation upon the teat cups hereinafter described. The valve is now in the original position and the cycle of operation is repeated.

To understand the operation of the teat cup, it may be assumed that the passage $l$ is connected with the pulsator hereinbefore described, in which case the pipe $l$ would be alternately connected with pressure and exhaust while the milk discharge from the tube $n$ would be in constant communication with a source of suction but would receive pressure fluid once in each cycle of operations of the pulsator. It will be understood, therefore, that after each teat is placed in a cup, the vacuum is turned on, and thereafter the tube $n$ is always, during operation, in communication with the vacuum. At the time of adjustment, the passage $l$ is also connected with the vacuum. As the inside of the cup $a$ and the chamber $f$ are both in communication with the vacuum, the pressures are balanced and the cup retains its natural shape, allowing the teat to be drawn down into the cup by the vacuum. The passage $l$ is now disconnected from the vacuum and connected with a source of pressure. The valve $m$ closes and prevents the pressure reaching the chamber $f$ while the passages $j$ and *i* are open and freely admit the pressure to the cushion *c*, filling it and causing the upper portion of the cup to collapse and compress the upper portion of the teat. The expansion of the cushion *c* drives all air remaining in the upper portion of the chamber *f* downward and so causes a pressure on the lower part of the teat. It will be clearly seen that this pressure, though much lower than that of the cushion *c*, will be higher than that inside of the cup *a*, which is in communication with the vacuum of greater intensity than at the time of exhaust of chamber *f*, as will be hereinafter explained. The heavy pressure around the upper portion of the teat drives the milk out of this portion. Because of the pressure on the lower portion of the teat, the milk passage cannot swell and the milk must pass out of the teat into the cup and from there through the tube *n* to the milk receptacle. The passage *l* is now disconnected from the source of pressure and is again connected with the source of vacuum and the tube *n*. The pressure immediately escapes from cushion *c* until it and also that in chamber *f* approximate the vacuum inside the cup *a;* but because of the hindrance to escape of air offered by the frictional resistance of the pipes leading to the milk pail and their obstruction by milk the vacuum is, at this time, less than that of the source of suction. Were it not for this condition the pressure in *f* during the compression part of the cycle might be too small to obtain the results desired. Even if, during the compression part of the cycle, there should not be an absolute increase of pressure in the chamber *f*, still there is an increase in such pressure relatively to that within the cup, due to the conditions above explained. All flexible parts now assume their natural positions, the teat is again drawn into the cup *a* by the vacuum and the cycle is repeated.

It will be noted that the same pressure which prevents the expansion of the milk passage through the teat also prevents the dilation and congestion of the end of the teat which would otherwise cause soreness.

The air escaping from cushion *c* performs several functions. 1st. The escape allows the collapse of the cushion and the expansion of the cup *a* ready for the movement of the teat as previously described. 2nd. Part of the air escapes directly to the milk pail through the pulsator and milk discharge pipe. 3rd. Because of a partial obstruction of the milk pipe, by milk, making a resistance to the instantaneous flow of the air to the milk pipe, a variable portion of the air passes through tube *n* to the cup *a* and produces pulsations in the vacuum at this point. It also makes a variation in the mean intensity of the vacuum in the cup. If the cow gives her milk freely, the obstruction in the pipe is great, and the air escapes to the pail slowly, causing a reduction in vacuum at the pulsator and cup. At the same time, because of the slow flow of air to the pail, a large proportion of the air goes to the cup, causing a great amplitude of pulsation. If the flow of milk is slight, the milk discharge pipe is comparatively unobstructed, and the air from the cushions flows to the pail almost instantaneously, and little or almost no air goes to the cup. This results in a higher mean vacuum at the pulsator and cup and also a lesser amplitude of pulsation in the vacuum. In fact, with heavy flows of milk the maximum vacuum at the cup is less than two-thirds that at the milk pail and the amplitude of pulsation is from about atmospheric pressure to the said maximum vacuum. With very slight flow of milk, as when stripping, the maximum vacuum is practically equal to that in the milk pail, while the amplitude of pulsation is often so slight as to be almost a continuous suction.

While I have hereinbefore spoken of a " vacuum ", I adopt that term for purposes of convenience, and mean thereby to cover any degree of pressure less than that of the atmosphere. While I have also spoken of increasing the pressure upon the outside of that part of the cup adapted to surround the lower portion of the teat during the application of pressure to the base of the teat, I do not mean to limit myself to an actual increase of the pressure within the space around the lower part of the cup, but mean to include any condition, including an absolute diminution of such pressure, provided such pressure increases relatively to the pressure within the cup.

From the foregoing description of my new process it will be understood that it is especially adapted for use in connection with, and to more effectively carry out, the process set forth in the patent issued to me October 29, 1912, No. 1,043,013.

Having now fully described my invention, what I claim and desire to protect by Letters Patent is:

1. The method of mechanically milking, which consists in intermittently applying a squeezing pressure upon the base of the teat and in unison therewith a substantially lesser pressure upon the lower part of the teat, thereby, during the squeezing pressure upon the base of the teat, maintaining a supporting pressure upon the lower portion of the teat to prevent expansion of the milk passage and dilation of the teat while maintaining the milk passage open and insuring the free discharge of milk therefrom.

2. The method of mechanically milking which consists in intermittently increasing the pressure upon the base of the teat and substantially simultaneously therewith increasing the pressure to a lesser degree upon the remainder of the teat and maintaining the latter pressure during only the period of the maintenance of the increased pressure upon the base of the teat.

3. The method of mechanically milking which consists in applying a squeezing pressure upon the base of the teat and substantially simultaneously therewith applying a pressure of a lesser degree upon the remainder of the teat, maintaining said pressures in unison and substantially simultaneously removing said pressures.

4. The method of mechanically milking which consists in flexibly inclosing and supporting substantially the entire teat, intermittently applying a squeezing pressure upon the base of the teat to expel the milk therefrom and substantially simultaneously therewith increasing the pressure upon the remainder of the teat to a degree sufficient to prevent substantial dilation or expansion but insufficient to produce substantial constriction thereof whereby the milk passage therein will be maintained open to insure the free discharge thereof without injury to the teat.

5. The method of mechanically milking which consists in applying a squeezing pressure upon the base of the teat and substantially simultaneously therewith applying upon the remainder of the teat pressure of a lesser degree sufficient to prevent substantial dilation and expansion by the milk discharging therethrough but insufficient to produce substantial constriction thereof, and alternately therewith removing said pressures.

6. The method of mechanically milking, which consists in flexibly supporting substantially the entire teat, intermittently applying a pressure upon the base of the teat and, while applying suction to the discharge portion of the teat, increasing the suction simultaneously with said application of pressure upon the base of the teat, whereby the remainder of the teat is subjected to external pressure of a lesser degree.

7. The method of mechanically milking, which consists in intermittently applying a relatively strong pressure upon the base of the teat and simultaneously applying a lesser pressure to the remainder of the teat, and applying suction to the discharge portion of the teat and increasing said suction simultaneously with the application of pressure upon the base of the teat, thereby creating an effective supporting pressure upon the lower portion of the teat during the squeezing action upon the base of the teat.

8. The method of mechanically milking, which consists in flexibly supporting substantially the whole teat, applying suction to the discharge portion of the teat, intermittently applying pressure to the base of the teat while simultaneously increasing said suction, and alternately therewith relieving the pressure upon the base of the teat while simultaneously decreasing said suction, thereby causing the lower portion of the teat to be externally compressed during the squeezing action upon the base of the teat.

9. The method of mechanically milking, which consists in flexibly inclosing and supporting substantially the entire teat, maintaining a partial vacuum within the inclosure, and intermittently applying a squeezing pressure to the base of the teat and simultaneously therewith increasing the vaccum within the inclosure.

10. The method of mechanically milking, which consists in constantly subjecting the discharge portion of the teat to suction, flexibly supporting substantially the entire teat, intermittently applying a squeezing pressure to, and removing such pressure from, the base of the teat, and simultaneously with the release of said pressure diminishing said suction by the admission of pressure fluid.

11. The method of mechanically milking, which consists in intermittently compressing the base of the teat by air pressure and simultaneously causing air displaced by said air pressure to compress the remainder of the teat.

12. The method of mechanically milking, which consists in connecting the discharge portion of the teat with a partial vacuum while constantly applying to the portion of the teat below the base a degree of external pressure, intermittently subjecting the base of the teat to a squeezing action and alternately therewith admitting air into the milk discharge thereby during the squeezing action upon the base of the teat maintaining the pressure required to prevent expansion of the milk passage or dilation of the teat.

In testimony of which invention, I have hereunto set my hand, at Poughkeepsie, N. Y., on this 20th day of March, 1913.

JOHN L. HULBERT.

Witnesses:
H. F. WEIMAR,
N. W. MERRILL.